(12) United States Patent  
Bradburn

(10) Patent No.: US 6,525,760 B1
(45) Date of Patent: Feb. 25, 2003

(54) METHOD AND APPARATUS FOR EXPOSING AN IMAGE RECORDING MEDIUM

(75) Inventor: Grahame Bradburn, Herts (GB)

(73) Assignee: Fujifilm Electronic Imaging Limited, Herts (GB)

( * ) Notice: Subject to any disclaimer, the term of this patent is extended or adjusted under 35 U.S.C. 154(b) by 0 days.

(21) Appl. No.: 09/188,844

(22) Filed: Nov. 9, 1998

(30) Foreign Application Priority Data

Nov. 10, 1997 (EP) .............................................. 97309019

(51) Int. Cl.[7] .................................................. B41J 2/435
(52) U.S. Cl. ........................................ 347/262; 347/259
(58) Field of Search ................................ 347/262, 130, 347/133, 142, 259, 134, 241; 359/109; 372/6, 1, 15, 24, 128, 134; 385/123; 355/1

(56) References Cited

U.S. PATENT DOCUMENTS

| | | | | |
|---|---|---|---|---|
| 3,220,013 A | * | 11/1965 | Harris | 346/107 |
| 4,544,259 A | * | 10/1985 | Kamaoka et al. | 355/40 |
| 4,571,603 A | * | 2/1986 | Hornbeck et al. | 257/436 |
| 5,018,813 A | * | 5/1991 | Roddy et al. | 350/96.14 |
| 5,289,454 A | * | 2/1994 | Mohapatra et al. | 369/112.27 |
| 5,760,880 A | * | 6/1998 | Fan et al. | 355/67 |
| 5,805,751 A | * | 9/1998 | Kewitsch et al. | 385/43 |
| 5,837,962 A | * | 11/1998 | Overbeck | 219/121.6 |
| 5,909,237 A | | 6/1999 | Kerr et al. | 347/262 |
| 5,917,969 A | | 6/1999 | Gavrilovic et al. | 372/6 |
| 5,946,428 A | | 8/1999 | Aleksandrov et al. | 372/6 |
| 6,014,162 A | * | 1/2000 | Kerr et al. | 347/262 |
| 6,166,756 A | * | 12/2000 | White et al. | 347/239 |

FOREIGN PATENT DOCUMENTS

| | | | |
|---|---|---|---|
| EP | 0 483 827 A2 | * | 5/1992 |
| FR | 1.474.356 | * | 6/1967 |
| WO | WO 95/10868 | * | 4/1995 |
| WO | WO 96/20519 | * | 7/1996 |

* cited by examiner

Primary Examiner—John S. Hilten
Assistant Examiner—K. Feggins
(74) Attorney, Agent, or Firm—Sughrue Mion, PLLC

(57) ABSTRACT

Apparatus for exposing an image recording medium, the apparatus comprising a radiation source; a switch comprising an input arranged Lo receive radiation from the radiation source, and a plurality of imaging outputs, wherein the switch selectively routes the radiation received at the input to a selected one of the imaging outputs; and a device for directing the radiation from each imaging output onto the image recording medium to expose the image recording medium.

18 Claims, 5 Drawing Sheets

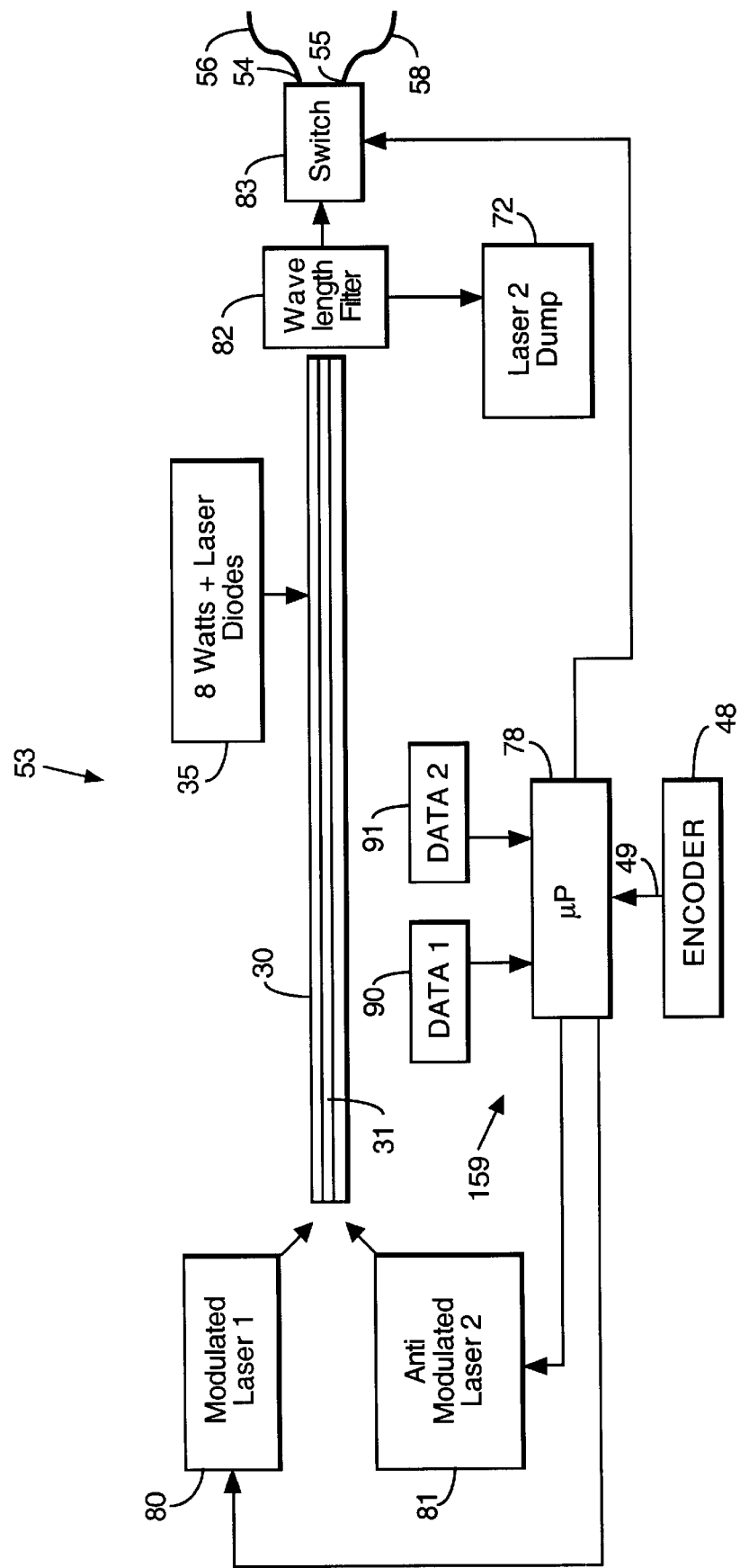

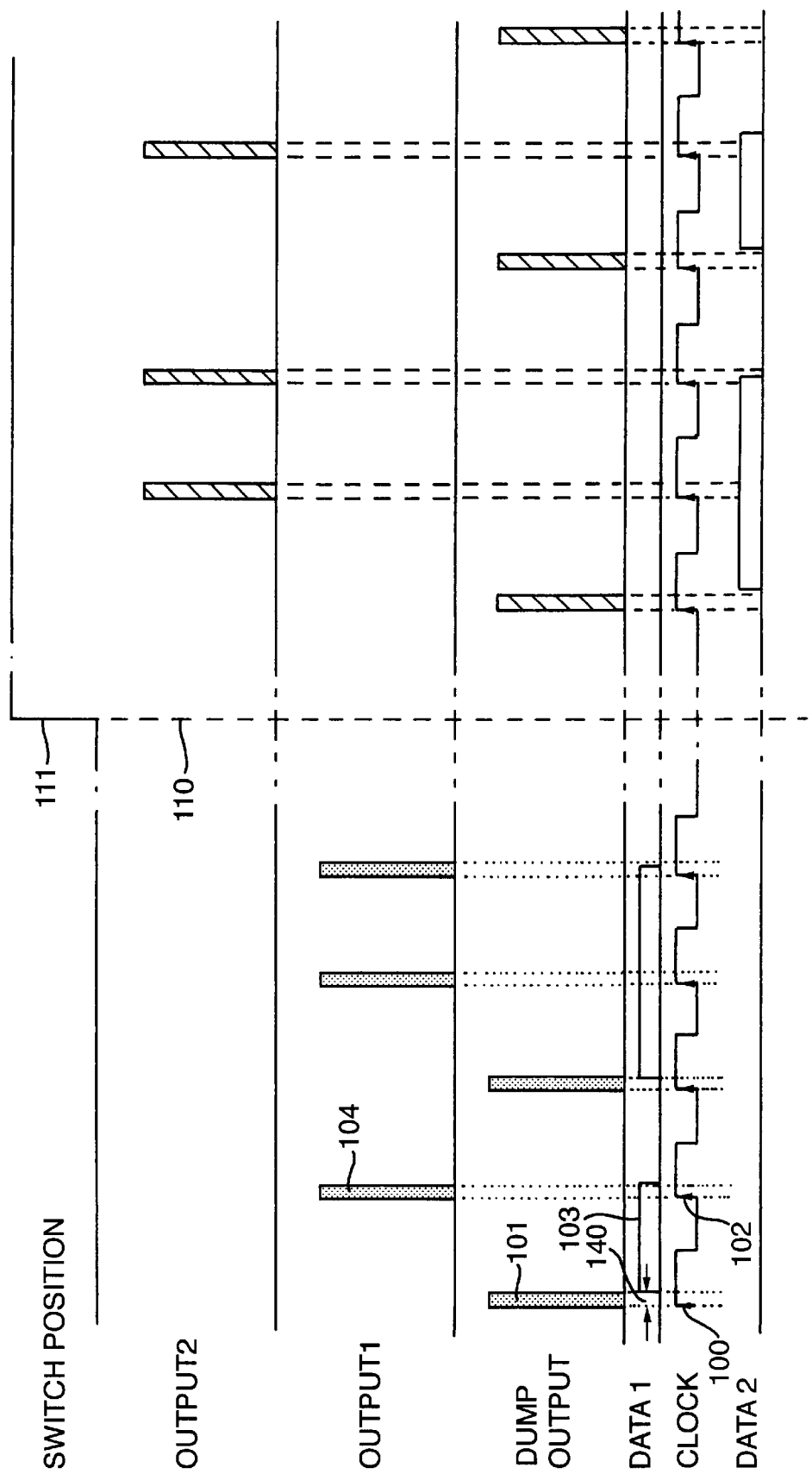

METHOD AND APPARATUS FOR EXPOSING AN IMAGE RECORDING MEDIUM

FIELD OF THE INVENTION

The present invention relates to a method and apparatus for exposing an image recording medium, such as a thermal printing plate.

DESCRIPTION OF THE PRIOR ART

FIG. 1 is a side view of a conventional single beam internal drum imagesetter. A laser 1 generates a laser beam 2 which is directed onto an angled reflective surface 3 of a spinning mirror 4. The spinning mirror 4 is rotated by a motor 5 which is mounted on a carriage (not shown). The carriage (not shown) is driven parallel to the axis of a drum 7 by rotation of a lead screw 6. Items 3–6 are housed inside the drum 7. One or more image recording plates (not shown) are mounted on the inner surface of the drum 7. To expose the image recording plates on the drum 7, the motor 5 moves along the axis of the drum 7, and rotates the spinning mirror 4 about the axis of the drum 7 whereby the reflected laser beam 8 exposes a series of circumferential scan lines.

As can be seen in FIG. 2, which is an end view of the apparatus shown in FIG. 1, during the lower 80° of its revolution, the reflected laser beam 8 is blocked by the carriage 136. This creates a shadow area 9 which prevents the scanner from exposing a full 360° of the drum 7 and reduces the speed and efficiency of the system. The angle of the area outside the shadow area 9 is conventionally known as the "drum angle".

A known way of improving on the efficiency and scanning time of the system of FIG. 1 is to add a second spinner and a second laser as illustrated in FIG. 3.

FIG. 3 illustrates the lower half 10 of a cylindrical drum. A first mirror 11 and a second mirror 12 are mounted at 180° to each other on a common shaft 13 which is rotated by a motor (not shown). A first laser 14 is directed at the spinning mirror 11, and a second laser 15 is directed at the spinning mirror 12. The distance between the reflective surfaces of the spinning mirrors 11,12 is equal to half the length of the drum. The laser 14 directs image radiation to the mirror 11 during one half cycle to expose a line on the upper half of the drum. The laser 15t directs image radiation to the mirror 12 during the next half cycle to expose another line on the upper half of the drum. The process continues until the right-hand spinner 12 has exposed the right-hand upper quarter of the drum, and the left-hand spinner 11 has exposed the left-hand upper quarter of the drum. Therefore the entire upper half of the drum can be exposed in half the time when compared with the system of FIG. 1. In addition the overall efficiency is increased since the lower half of the drum (which includes the shadow area 9) is not exposed.

A problem associated with the system of FIG. 3 is that two lasers 14,15 are required. The cost of lasers can be very high.

SUMMARY OF THE INVENTION

In accordance with a first aspect of the present invention there is provided apparatus for exposing an image recording medium, the apparatus comprising a radiation source; a switch comprising an input arranged to receive radiation from the radiation source, and a plurality of imaging outputs, wherein the switch selectively routes the radiation received at the input to a selected one of the imaging outputs; and means for directing the radiation from each imaging output onto the image recording medium to expose the image recording medium.

In accordance with a second aspect of the present invention, there is provided a method of exposing an image recording medium, the method comprising generating radiation in a radiation source; inputting the radiation to a switch having a plurality of imaging outputs; routing the radiation during a first period to one or more selected ones of the imaging outputs; routing the radiation during a second period to one or more different selected ones of the imaging outputs; and exposing the image recording medium with radiation, from the or each selected imaging output.

The present invention provides a routing device which enables a single radiation source to be used in a scanner of the type illustrated in FIG. 3. This results in a much simplified system with reduced cost.

The radiation which exposes the image recording medium is generally encoded with image information to expose a desired pattern of pixels. The radiation may be encoded downstream of the routing device, for instance with an acousto-optic modulator. Preferably however the radiation which is input to the routing device is already encoded, for instance by suitable control of the radiation source. Typically the radiation source inputs radiation in the form of a series of pulses to the routing device. This enables pixels to be exposed on the image recording medium with short, high power pulses, resulting in low thermal leakage.

In a preferred embodiment the radiation source comprises an optical amplifier having a pump energy source. The average power of the optical amplifier can then be conveniently adjusted by adjusting the power input by the pump energy source. The pump energy source may input electrical pump energy into the amplifier, but preferably the pump energy source comprises a radiation source such as an array of laser diodes.

The radiation source may be operated in a continuous wave mode as illustrated schematically in FIG. 4. A power source (not shown) provides a power signal on input line 16. When switch 17 is closed the laser cavity 18 outputs a laser beam 19. A problem with continuous wave mode is that the laser beam 19 cannot have a power any greater than the power on input line 16. This is a particular problem in thermal printing imagesetters where high laser power may be required.

Therefore preferably the radiation source is operated in pulsed mode, as illustrated schematically in FIG. 5. In this case a power source provides a power signal on input line 20 which is input continuously to the laser cavity 21. The laser cavity 21 stores the energy from input line 20 until switch 22 is closed to release the energy in the form of a high power pulsed laser beam 23. As a result, the power of the pulsed laser beam 23 can be higher than the power on input line 20. This enables pixels to be exposed on the image recording medium with short, high power pulses, resulting in low thermal leakage.

An example of a suitable radiation source is shown in FIG. 6. FIG. 6 illustrates a fibre amplifier of the type described in WO95/10868. The fibre amplifier comprises a fibre 30 having a Erbium-Ytterbium doped single-mode inner core 31 and a multi-mode concentric outer core 32. A single mode seed laser 33 directs an encoded laser beam 34 into the inner core 31. Pump radiation is provided by a pump source 35 (an array of multi-mode laser diodes) which is coupled, transversely with respect to the optical axis of the fibre 30, to the outer core 32. The method of coupling the pump source 35 to the fibre 30 is described in detail in WO96/20519. Pump radiation from the pump source 35 propagates through the outer core 32 and couples to the amplifying inner core 31, and pumps the active material in the inner core 31. Thus the fibre optic amplifier provides a highly amplified encoded output beam 36 at the wavelength of the encoded laser beam 34.

The fibre optic amplifier illustrated in FIG. 6 is primarily designed for use in telecommunications in which the encoded input laser beam 34 will not be off for a significant length of time. If the seed laser 33 is off for an extended period, the fibre 30 continues to accumulate energy from the pump source 35, and as a result the fibre 30 will go into spontaneous emission. This problem is common to all pulsed laser sources and as a result pulsed laser sources are generally not used in imaging applications where the laser may be off for an extended period of time.

In order to solve this problem, the apparatus preferably further comprising an energy dump; and means for directing the radiation from the radiation source either to the energy dump or to the image recording medium. This solves the spontaneous emission problem by providing an energy dump which is utilised to prevent excessive build up of energy in the radiation source.

The means for directing the radiation to the energy dump or the image recording means may comprise a switch. However it may be difficult for a conventional switch to operate at the switching frequency required. Therefore preferably the radiation source comprises a data radiation source and a dump radiation source which generate encoded radiation at respective different wavelengths, and an optical amplifier which amplifies the encoded radiation; and wherein the means for directing the radiation either to the energy dump or to the image recording medium comprises a filter which directs the amplified radiation to the image recording medium or to the energy dump in accordance with the wavelength of the amplified radiation. In this case the apparatus typically further comprises means for encoding the radiation from the dump radiation source whereby radiation is only generated by the dump radiation source when radiation is not being generated by the data radiation source. This increases efficiency and further reduces the risk of spontaneous emission.

The switch typically comprises an electro-optic switch, such as an integrated optic switch. Any suitable radiation source may be used, such as a continuous wave laser or a pulsed laser (for instance the laser of FIG. 6).

The radiation may be transmitted through air to the image recording medium, but preferably the means for directing the radiation from each imaging output onto the image recording medium comprises a plurality of fibre-optic cables, each coupled to a respective one of the imaging outputs. This arrangement improves coupling efficiency, reduces alignment problems, and makes the apparatus safer by confining the imaging radiation beams (which may have dangerously high power). Preferably the radiation source comprises a fibre laser which provides an output suitable for coupling to the fibre-optic cables.

The apparatus may be used in a conventional imagesetter. However it is particularly suited to a thermal imagesetter in which the radiation source generates radiation of a wavelength and power suitable for exposure of a thermal imaging plate. Suitable wavelengths are in the infra-red region. Typically the image recording medium has a media sensitivity of 50–200 mJcm$^{-2}$. Typically the average power delivered by the radiation source at the image recording medium is 2–10W (in the case where the image recording medium is exposed uniformly).

BRIEF DESCRIPTION OF THE DRAWINGS

A number of examples of the present invention will now be described with reference to the accompanying drawings, in which:

FIG. 9 is an example of the radiation source and control means of FIG. 7; and

FIG. 10 illustrates an encoding scheme for the system of FIG. 9.

DETAILED DESCRIPTION OF EMBODIMENTS

Figure 7:
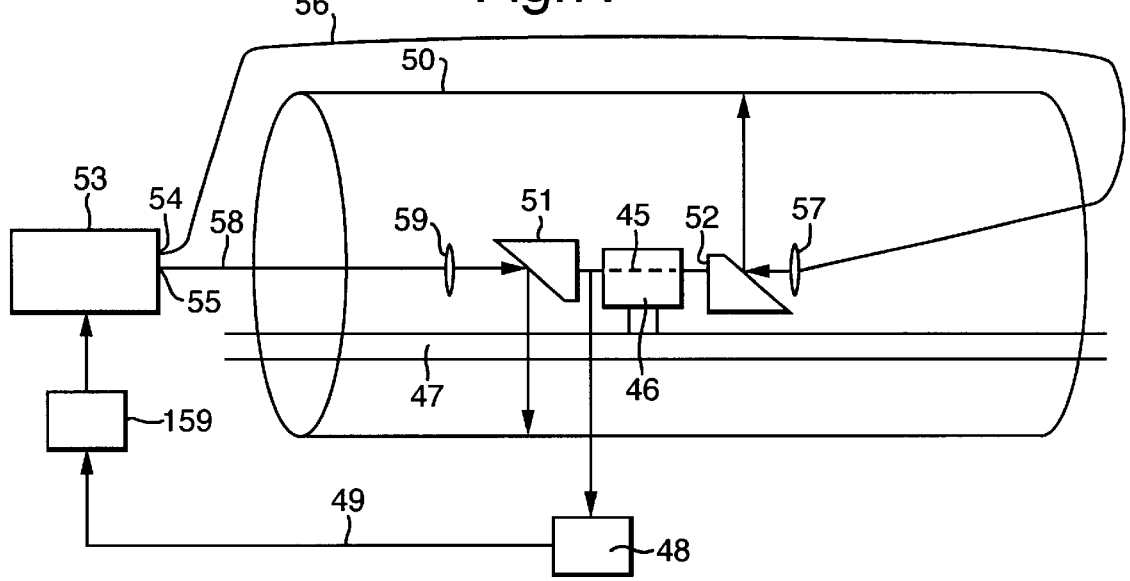
FIG. 7 is a schematic side view of a double mirror imagesetter incorporating an example of apparatus according to the present invention.

Referring to FIG. 7, an internal drum thermal imagesetter comprises a drum 50 carrying one or more thermal imaging plates (not shown) on its inner surface. Two spinning mirrors 51,52 are mounted at 180° to each other on a common shaft 45 which is rotated by a motor 46 on a carriage (not shown) which is driven by a lead screw 47. An encoder 48 encodes the angular position of the shaft 45 to provide a series of pulses which are frequency multiplied by a desired factor to generate a clock signal 49 at a desired frequency (typically 20–120 MHz). A laser is schematically indicated at 53, and has a pair of imaging outputs 54,55. Radiation from the imaging output 54 is input to a first fibre optic cable 56 which is fixed at its far end to a first lens 57 which is fixed in relation to the spinning mirror 52. Radiation from the imaging output 55 is input to a second fibre optic cable 58 which is fixed at its far end to a second lens 59 which is fixed in relation to the spinning mirror 51. Control means schematically indicated at 159 controls the laser 53 such that encoded radiation is selectively directed to a selected one of the spinning mirrors 51,52.

Figure 8:
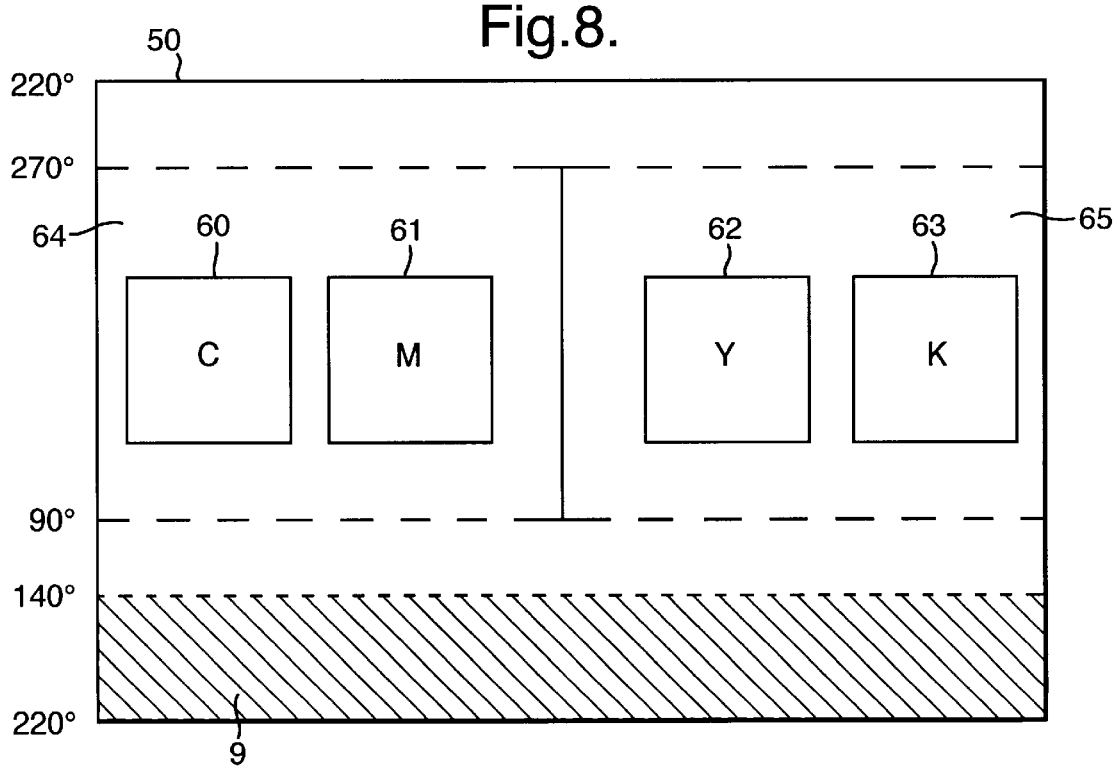
FIG. 8 illustrates the surface of the drum shown in FIG. 7.

FIG. 8 is a flattened representation of the outer surface of the drum 50. The shadow area 9 lies between 140° and 220° and the upper half of the drum lies between 270° and 90°. Four thermal imaging plates 60–63 are mounted on the upper half of the drum. The left-hand mirror 51 exposes plates 60 and 61 (in the upper left quarter 64 of the drum) with cyan and magenta image separations, and the right-hand mirror 52 exposes plates 62 and 63 (in the upper right quarter 65 of the drum) with yellow and black image separations.

Figure 1:
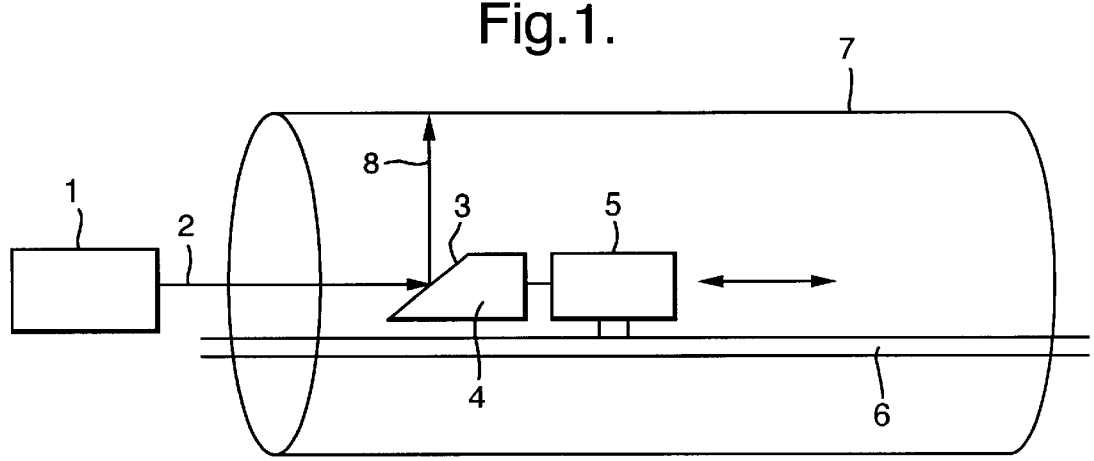
FIG. 1 is a side view of a conventional single mirror imagesetter.
Figure 2:
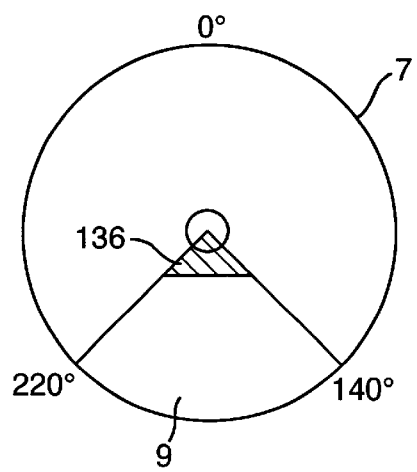
FIG. 2 is an end view of the imagesetter of FIG. 1.
Figure 3:
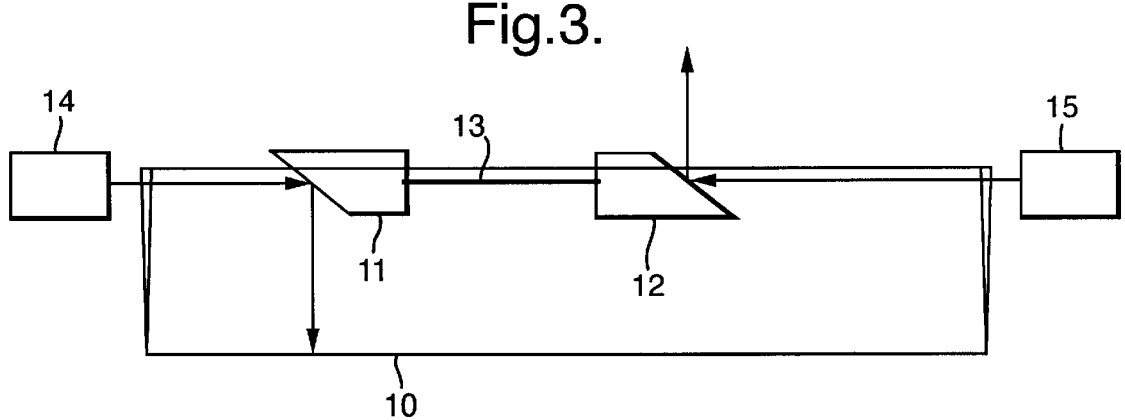
FIG. 3 is a side view of a double mirror imagesetter.
Figure 4:
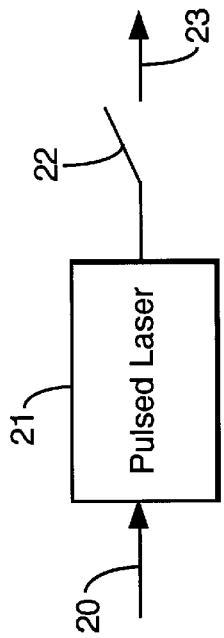
FIG. 4 is a schematic illustration of a continuous wave laser.
Figure 5:
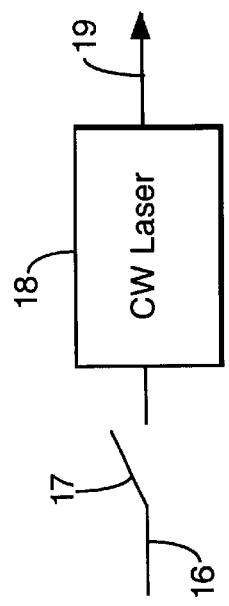
FIG. 5 is a schematic illustration of a pulsed laser.
Figure 6:
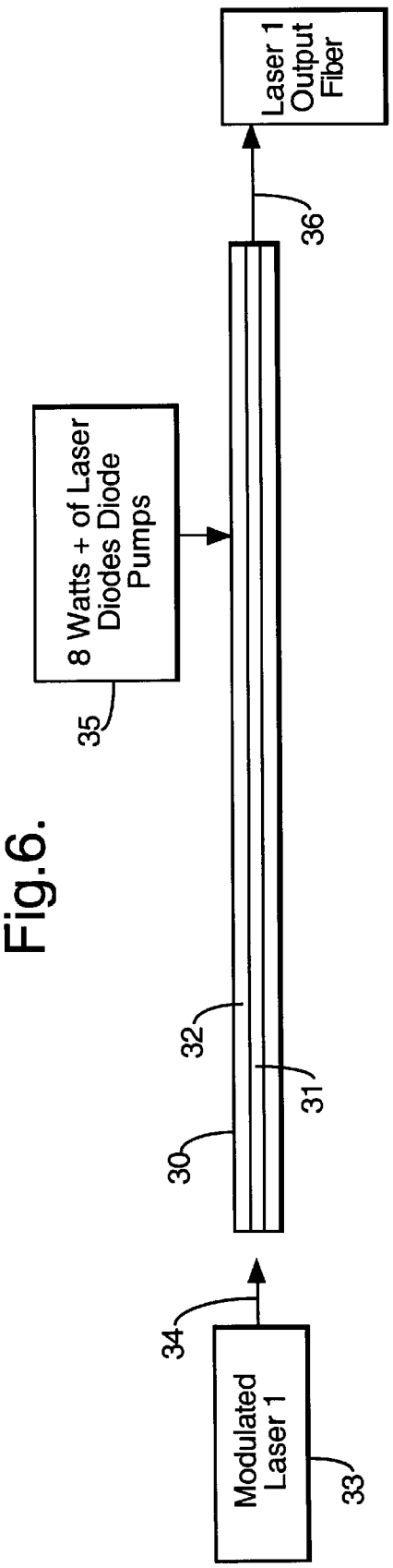
FIG. 6 is a schematic illustration of a pulsed laser of the type described in WO95/10868 and WO96/20519.

FIG. 9 illustrates an example of the radiation source 53 and control means 159 indicated schematically in FIG. 7. The radiation source 53 comprises an optical fibre laser amplifier of the type illustrated in FIG. 6 (like reference numerals being used for like components) and described in WO95/105868 and WO96/20519. A suitable radiation source is the IRE-Polus YLPM-Series Pulsed Yterrbium Doped Fibre laser.

A single data laser 80 directs an encoded beam into the inner core 31 of the fibre 30 under control of microprocessor 78. Dump laser 81 directs an encoded beam at a different wavelength into the core 31. The beam from dump laser 81 is encoded by microprocessor 78 such that the laser 81 is only on when the data laser 80 is off.

Wavelength filter 82 directs amplified signal from the data laser 80 to a switch 83, and amplified signal from the dump laser to energy dump 72. Microprocessor 78 operates the switch 83 such that radiation is directed along fibre-optic 56 for the first half of a revolution of the shaft 45, (FIG. 7) and along fibre-optic 58 for the second half. Suitable switches 83 are the SM-TOS1.3.M.250 or SM-TOS1.5-M-250 single-mode thermo-optic switch modules distributed by Photonic Integration Research, Inc.

One example the data laser 80 emits radiation at 1010 nm, and the dump laser 81 emits radiation at 1020 nm. The pair of imaging outputs 54,55 (output 1 and output 2) are coupled to the fibre-optic cables 56,58. The seed lasers 80,81 are low power single mode lasers.

The power of the pump laser diodes 35 can be selected in accordance with the desired power to be delivered on the film. The required power is determined by the media sensitivity (typically 50–200 mJcm$^{-2}$), drum angle (typically 209 degrees), resolution (typically 48–144 lines/mm), film height (typically 930 mm), film width (typically 1130 mm) spinner speed (typically 30,000 RPM), and optics efficiency (typically 90%). As a result the power of the pump diodes is typically selected to give an output power of 3–10W. In the example of FIG. 9, the pump diodes 35 deliver 8W.

A first data store 90 contains binary image data to be recorded as a pattern of pixels on the upper left quarter of the drum 50 via first imaging output 54 (output 1). A second data store 91 contains binary image data to be recorded as a pattern of pixels on the upper right quarter of the drum via second imaging output 55 (output 2). The microprocessor 78 reads out the data from the stores 90,91 in response to the clock signal 49 from encoder 48. The microprocessor 78 controls the lasers 80,81 and switch 83 as described in the example of FIG. 10.

FIG. 10 illustrates the radiation output by imaging output 54 (output 1), imaging output 55 (output 2) and dump output 72. The binary image data read out from data stores 90 (data 1) and 91 (data 2) are also shown, along with the clock signal 49 which has a clock period of 20 ns.

For the first halt revolution of shaft 45 (to tile l,it of line 110), mirror 52 (output 1) exposes a line on the upper right quarter 65 of the drum (FIG. 8). Only part of the line is illustrated in FIG. 10. For the second half revolution of shaft 45 (to the right of line 110), mirror 51 (output 2) exposes a line on the upper left quarter 64 of the drum.

The microprocessor 78 controls the seed laser 80,81 such that a radiation pulse is output by the amplifier on each positive clock step. If data 1 is high, then a radiation pulse is output on the first output 54 to expose a single pixel. If data 2 is high, then a radiation pulse is output on the second output 55 to exposes a single pixel. If neither data lines are high, then a radiation pulse is output to energy dump 72. Therefore the dump laser 81 is encoded as NOT(DATA1 OR DATA2). In the encoding scheme of FIG. 10 it can be seen that data 1 and data 2 are never high at the same time.

For example, at the first positive clock step 100, neither data 1 nor data 2 are high. Therefore the microprocessor 78 causes the dump laser 81 to emit a 2 ns pulse which is, amplified to generate a 2 ns amplified radiation pulse 101 to be output to the energy dump 72.

After a short time lag 140 (exaggerated in FIG. 10 for illustrative purposes) after the positive clock pulse 100, the microprocessor receives a pulse 103 from store 90.

Hence at the second positive clock step 102, data 1 is high and the microprocessor 78 causes the data laser 80 to emit a 2 ns pulse which causes an amplified 2 ns radiation pulse 104 to be emitted from output 54.

The duration of the pulses emitted by the seed lasers 80,81 can be adjusted by an RS 232 command before running an image. The pulse duration can be set equal to the clock period of 20 ns, resulting in a continuous wave mode in which the pulses 101,104 are not temporally separated, and in which radiation is continuously input to the filter 82. However preferably the pulse duration is set to less than the 20 ns clock period (for instance 2 ns as shown in FIG. 10), resulting in a pulsed mode in which the pulses are temporally separated (in the example of FIG. 10 by 18 ns) and in which radiation is input as a series of pulses to the filter 82. The total energy deposited over a 20 ns clock cycle is the same in both continuous and pulsed mode, and is set by the power of the pump diodes 35 (in this case 8W*20 ns=0.16 microjoules). However it is preferable to deposit this energy in a short time (eg. 1 or 2 ns) since this results in less thermal leakage. In addition the energy deposited on the film convolves less across the film when the pulse duration is short.

The imaging beam is switched between the fibre-optic cables 56,58 at 110 by a switching signal 111 from microprocessor 78.

Other laser wavelengths and/or clock frequencies may be required for the system of FIG. 9 if dictated by the performance of the switch 83.

I claim:

1. Apparatus for exposing an image recording medium, the apparatus comprising a radiation source; a switch comprising an input arranged to receive radiation from the radiation source, and a plurality of imaging outputs, wherein the switch selectively routes the radiation received at the input to a selected one of the imaging outputs; and means for directing the radiation from each imaging output onto the image recording medium to expose the image recording medium; and further comprising an energy dump; and means for directing the radiation from the radiation source either to the energy dump or to the image recording medium; wherein the radiation source comprises a data radiation source and a dump radiation source which generate encoded radiation at respective different wavelengths, and an optical amplifier which amplifies the encoded radiation; and wherein the means for directing the radiation either to the energy dump or to the image recording medium comprises a filter which directs the amplified radiation to the image recording medium or to the energy dump in accordance with the wavelength of the amplified radiation.

2. Apparatus according to claim 1, further comprising means for encoding the radiation from the dump radiation source whereby radiation is only generated by the dump radiation source when radiation is not being generated by the data radiation source.

3. Apparatus according to claim 1, further comprising a pump radiation source which pumps the optical amplifier with pump radiation, wherein the power of the pump radiation source is greater than the power of the data radiation source and the dump radiation source.

4. Apparatus according to claim 1, wherein the switch comprises an electro-optic switch.

5. Apparatus according to claim 1, wherein the means for directing the radiation from each imaging output onto the image recording medium comprises a plurality of fibre-optic cables, each coupled to a respective one of the imaging outputs.

6. Apparatus according to claim 1, wherein the radiation source generates radiation of a wavelength and power suitable for exposure of a thermal imaging plate.

7. Apparatus according to claim 1, wherein the radiation source inputs radiation in the form of a series of pulses to the switch.

8. Apparatus according to claim 1, wherein the radiation source comprises an optical amplifier having a pump energy source.

9. An imagesetter comprising a support for supporting an image recording medium to be exposed; and apparatus for exposing the image recording medium, the apparatus comprising a radiation source; a switch comprising an input arranged to receive radiation from the radiation source, and a plurality of imaging outputs, wherein the switch selectively routes the radiation received at the input to a selected one of the imaging outputs; and means for directing the radiation from each imaging output onto the image recording medium to expose the image recording medium; further comprising an energy dump; and means for directing the radiation from the radiation source either to the energy dump or to the image recording medium; wherein the radiation source comprises a data radiation source and a dump radiation source which generate encoded radiation at respective different wavelengths, and an optical amplifier which amplifies the encoded radiation; and wherein the means for directing the radiation either to the energy dump or to the image recording medium comprises a further which directs the amplified radiation to the image recording medium or to the energy dump in accordance with the wavelength of the amplified radiation.

10. An imagesetter according to claim 9, further comprising means for encoding the radiation from the dump radiation source whereby radiation is only generated by the dump radiation source when radiation is not being generated by the data radiation source.

11. An imagesetter according to claim 9, further comprising a pump radiation source which pumps the optical amplifier with pump radiation, wherein the power of the pump radiation source is greater than the power of the data radiation source and the dump radiation source.

12. An imagesetter according to claim 9, wherein the switch comprises an electro-optic switch.

13. An imagesetter according to claim 9, wherein the means for directing the radiation from each imaging output onto the image recording medium comprises a plurality of fibre-optic cables, each coupled to a respective one of the imaging outputs.

14. An imagesetter according to claim 9, wherein the radiation source generates radiation of a wavelength and power suitable for exposure of a thermal imaging plate.

15. An imagesetter according to claim 9, wherein the radiation source inputs radiation in the form of a series of pulses to the switch.

16. An imagesetter comprising apparatus for supporting at least one image recording medium to be exposed; and apparatus for exposing the at least one image recording medium, the apparatus comprising a radiation source for generating a radiation beam modulated with image information; a switch comprising an input arranged to receive radiation from the radiation source, and a plurality of imaging outputs, wherein the switch selectively routes the radiation received at the input to a selected one of the imaging outputs; a set of reflectors, each positioned to receive radiation from a respective one of the imaging outputs and for directing the radiation from the imaging output onto an image recording medium to expose the image recording medium; and a system for causing relative scanning movement between the supporting apparatus and the reflectors.

17. An imagesetter according to claim 16, wherein the reflectors each comprise a spinning mirror also mounted for movement parallel to the supporting apparatus.

18. A method of exposing at least one image recording medium, the method comprising generating a radiation beam modulated with image information to be recorded on the image recording medium; routing the radiation beam selectively to one of a plurality of imaging outputs, each imaging output being associated with a respective reflector onto which the beam is directed; causing each reflector to reflect the received beam onto the at least one recording medium; and causing relative scanning movement between the reflectors and the at least one image recording medium.

* * * * *